July 1, 1941.    C. BORGWARD    2,247,985
CONTROL GEAR FOR MOTOR VEHICLES WITH FOUR WHEEL STEERING ARRANGEMENT
Filed July 1, 1939
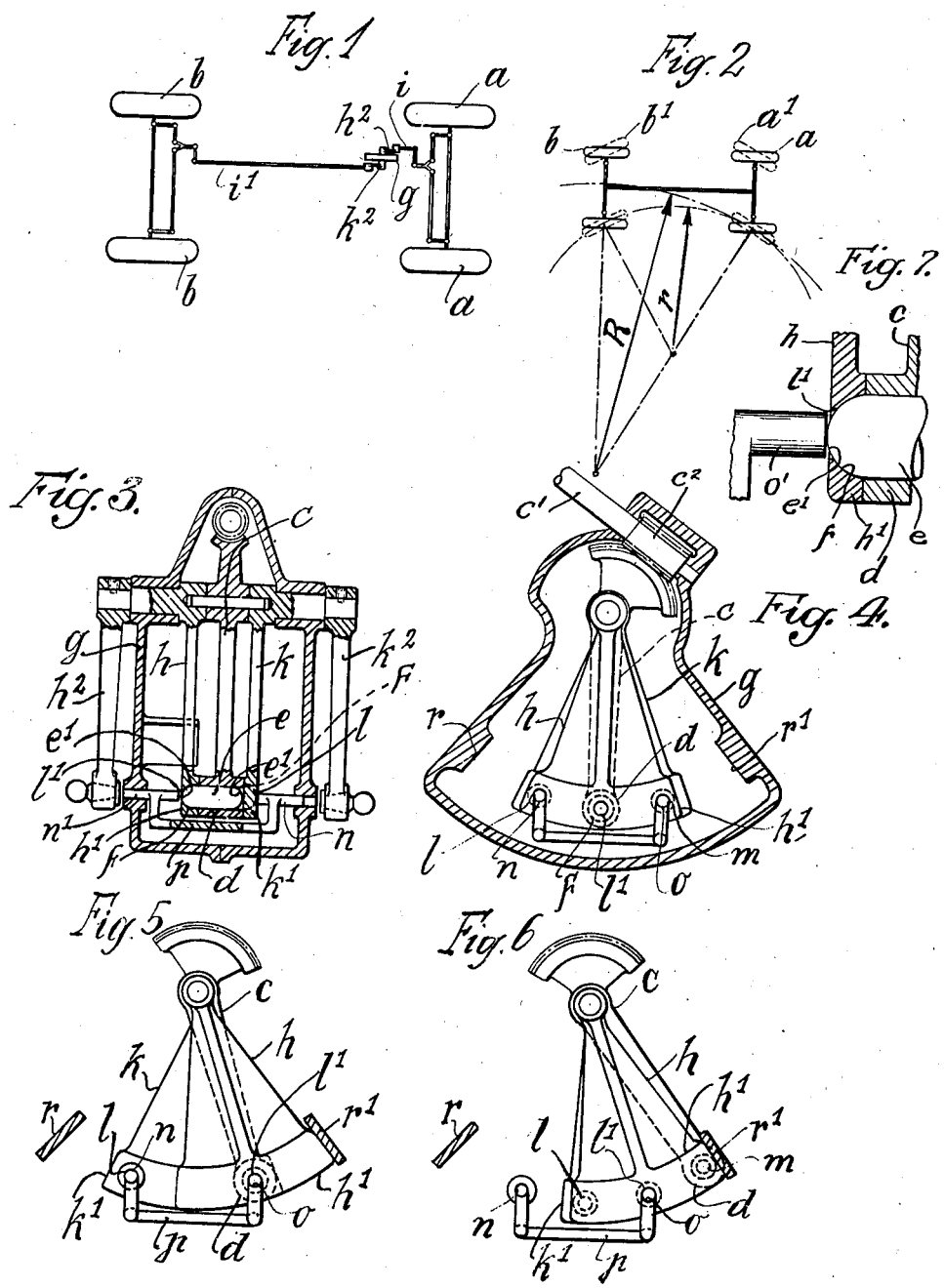

Patented July 1, 1941

2,247,985

UNITED STATES PATENT OFFICE 2,247,985

CONTROL GEAR FOR MOTOR VEHICLES WITH FOUR WHEEL STEERING ARRANGEMENT

Carl Borgward, Bremen, Germany

Application July 1, 1939, Serial No. 282,545
In Germany December 17, 1936

5 Claims. (Cl. 280—91)

It is known in connection with motor vehicles with four wheel steering arrangement to first veer the front wheels and then to adjust the rear wheels at the same time as the front wheels for additional steering.

The radius of the curve to be described is thus reduced. As compared with the known vehicles with four wheel steering arrangement the rear wheels become operative after the front wheels have been veered only slightly. On straight roads and roads with gentle curves which can be negotiated at high speeds the four wheel steering is inferior to the two wheel steering as it increases the danger of rolling. In the case of sharp curves which are negotiated at reduced speed and in which the normal two wheel obliquity has already been reached the reduction of the steering radius with the four wheel steering arrangement is preferable.

According to the invention the construction of the steering arrangement is such that the steering of the rear wheels does not commence before the front wheels have reached their maximum angle of obliquity and consequently the steering angle of obliquity of the rear wheels is not used up before the front wheels have reached their maximum angle of obliquity. The steering of the rear wheels is initiated automatically only when the front wheels have been veered into their extreme steering position. Thus rolling and unsafe driving at high speeds on straight roads is counteracted. A transverse setting of the rear wheels and consequently lateral locking even if it is only slight is avoided. The invention therefore reduces the danger of skidding.

The invention consists in that the clutch members lock the front wheels when they have reached their extreme angle of obliquity and if the steering lever is swung further the steering lever system for the rear wheels participates in the movement.

Other features of the invention consist in the special construction of the steering arrangement.

The invention can be carried out in various ways. An embodiment thereof is illustrated by way of example in the accompanying drawing, in which—

Fig. 1 is a plan view of a vehicle showing the steering arrangement diagrammatically, Fig. 2 is a diagrammatic view showing the position of the wheels during the veering, Fig. 3 shows a steering lever arrangement in longitudinal section, Fig. 4 is a cross-section of Fig. 3, Fig. 5 shows in side elevation the position of the lever after the actuation of the front wheels, Fig. 6 shows the position of the lever after the actuation of the rear wheels.

Fig. 7 is an enlarged fragmentary detail, partly in section and showing a portion of a certain latching mechanism used in this invention.

The vehicle is fitted with four wheel steering arrangement so that both the front wheels $a$ and also the rear wheels $b$ are steered. According to the invention the steering takes place in such a manner that first the front wheels $a$ are set in the oblique position $a_1$ shown diagrammatically in dot-dash lines in Fig. 2, whereas the rear wheels $b$ still remain in their central position and are here locked against accidental adjustment.

The vehicle therefore runs in a curve having approximately the radius R. Only hereafter, while the front wheels are locked, the rear wheels are additionally veered during the further turning of the steering wheel, in the known manner in opposite direction so that they assume the position $b_1$. Thus the curve which the vehicle describes is reduced. The radius of curve is now $r$, as shown in Fig. 2. During the veering of the rear wheels the front wheels $a$ are locked in the oblique position so that they cannot swing back accidentally.

The steering mechanism proper can be constructed in various ways. One form of construction is illustrated by way of example in Figs. 3 to 6 of the drawing.

A main steering lever $c$ actuated from the steering column $c'$ through the gearing $c^2$ serves as steering means. This lever $c$ carries in a boss $d$ at its end a movable catch $e$ which can be pushed out of the boss on both sides. This catch $e$ has two rounded ends $e_1$ and engages in a recess $f$ in a steering lever $h$ for the front wheels oscillatably mounted in a casing $g$, beside the main steering lever $c$. This steering lever $h$ carries on its end a sector $h_1$ in the middle of which the recess $f$ is located. This lever $h$ is connected outside the casing $g$ with another lever $h_2$ connected to the steering rod system $i$ for the front wheels.

The catch $e$ while it engages the recess $f$ in the lever $h$, bears at its other end against a sector $k_1$ of the steering lever $k$ for the rear wheels. A lever $k_2$ is connected with the steering lever $k$ which in turn is connected to the steering rod system $i_1$ of the rear wheels. The sector $k_1$, which to facilitate distinction, is shown somewhat wider than the segment $h_1$ in the drawing, has two guide holes $l$, $m$ for locking bolts $n$, $o$ which are connected by a strap $p$. On the other side there are two similar locking bolts $n_1$, $o_1$ in the casing near the steering lever $h$, which bolts are connected to the bolts $n$, $o$ by the strap $p$. The sector $h_1$ also has a hole $l_1$ at the point where the catch $e$ engages, that is in the recess $f$, through which hole a locking bolt $o'$ or $n'$ may if desired extend.

Abutments $r$, $r_1$ are provided for the lever $h$ on both sides of the casing $g$.

The mechanism operates in the following manner:

In the inoperative position the levers are in the position shown in Figs. 3 and 4. In this position the catch $e$ of the main steering lever $c$ is engaged in the recess $f$ in the lever $h$ for the front wheels. The steering lever $k$ for the rear wheels is secured against accidental displacement in that the locking bolts $n$, $o$ engage in the holes $l$ of the steering lever $k$ and of the casing $g$. If it is desired to steer the vehicle into a curve the main steering lever $c$ is adjusted by the steering wheel and at the same time the steering lever $h$ for the front wheels is moved. These wheels are brought into the position $a_1$ as shown in Fig. 2, being swung until the sector $h_1$ of the lever $h$ comes into contact with the abutment $r_1$. If the main steering lever $c$ is swung further with the object of describing a smaller curve, the catch $e$ during the adjustment of the main steering lever $c$ will slip out of the recess $f$ in the lever $h$ and into the corresponding recess of the opposite lever $k$ because it is now directly opposite this recess $m$ in the sector $k_1$. At the same time, however, the locking bolt engaging the hole $l$ will be pushed out of the sector $k$ by the catch $e$. By means of the strap $p$ the locking bolt $n_1$ is pushed into the hole $l_1$ in the lever $h$. The steering lever $h$ for the front wheels is consequently now fixed. On the other hand the steering lever $k$ for the rear wheels is freed. If the lever $c$ is turned further, the steering lever $k$ and consequently the steering lever $k_2$ are also shifted with the result that the rear wheels are adjusted into the position $b_1$ shown in Fig. 2.

Figs. 5 and 6 show the two positions of the levers, in Fig. 5 after the segment $h_1$ has been set and in Fig. 2 after the lever $k$ has also been adjusted with the sector $k_1$.

For steering the vehicle in the opposite direction the levers are swung correspondingly towards the other side, for which reason several engaging holes are necessary in the segments for the catches $e$ and locking bolts $n$, $o$.

I claim:

1. Four-wheel steering gear for motor vehicles in which the front wheels are first adjusted and then the rear wheels are also adjusted for additional veering, comprising in combination a main steering lever, a front wheel steering lever, a rear wheel steering lever, an abutment in the path of movement of said front wheel steering lever, and coupling mechanism between said main steering lever and said front and rear wheel steering levers adapted to first engage and swing said front wheel steering lever into contact with said abutment for negotiating relatively wide curves and thereinafter to disengage from said front wheel steering lever and engage and swing said rear wheel lever for negotiating sharper curves.

2. In a four-wheel steering gear as specified in claim 1, the coupling mechanism comprising a slidable catch carried by the main steering lever and adapted at the movement of the main steering lever to first engage the front wheel steering lever and swing this lever into contact with its abutment, and then engage the rear wheel steering lever, and locking means actuated by said catch and adapted to lock the front wheel steering lever in its extreme position and liberate the rear wheel steering lever.

3. In a four-wheel steering gear as specified in claim 1, the coupling mechanism comprising two sectors oscillatably mounted one on each side of said main steering lever and each having a recess on the side facing said main steering lever, one sector being formed on the front wheel steering lever and the other on the rear wheel steering lever, a catch transversely shiftable in the end of said main steering lever and adapted to first engage in the recess in the sector of the front wheel steering lever to lock said lever to said main steering lever and swing said sector into contact with the abutment and to then slide out of engagement with this sector and engage in the recess in the sector of the rear wheel steering lever, to lock said last mentioned sector to said main steering lever.

4. In a four-wheel steering gear as specified in claim 1, the coupling mechanism comprising two sectors oscillatably mounted one on each side of said main steering lever and each having a recess on the side facing said main steering lever, one sector being formed on the front wheel steering lever and the other on the rear wheel steering lever, a catch transversely shiftable in the end of said main steering lever and adapted to first engage in the recess in the sector of the front wheel steering lever to lock said lever to said main steering lever and swing said sector into contact with the abutment and to then slide out of engagement with this sector and engage in the recess in the sector of the rear wheel steering lever, to lock said last mentioned sector to said main steering lever, bolts controlled by said catch and adapted to alternately lock the front wheel steering lever and the rear wheel steering lever according to the engagement of said catch, and a strap connecting the locking bolts of the front and rear wheel steering levers.

5. In a four-wheel steering gear as specified in claim 1, the coupling mechanism comprising two sectors oscillatably mounted one on each side of said main steering lever and each having a recess on the side facing said main steering lever, one sector being formed on the front wheel steering lever and the other on the rear wheel steering lever, a catch transversely shiftable in the end of said main steering lever and adapted to first engage in the recess in the sector of the front wheel steering lever to lock said lever to said main steering lever and swing said sector into contact with the abutment and to then slide out of engagement with this sector and engage in the recess in the sector of the rear wheel steering lever, to lock said last mentioned sector to said main steering lever, bolts, two for the front wheel steering lever and two for the rear wheel steering lever, for the steering of the wheels in both directions, said bolts controlled by said catch and adapted to alternately lock the front wheel steering lever and the rear wheel steering lever according to the engagement of said catch, and a strap connecting the locking bolts of the front and rear wheel steering levers.

CARL BORGWARD.